US009674100B2

(12) United States Patent
Fu et al.

(10) Patent No.: US 9,674,100 B2
(45) Date of Patent: Jun. 6, 2017

(54) DYNAMIC ADJUSTMENT TO MULTIPLE BITRATE ALGORITHM BASED ON BUFFER LENGTH

(71) Applicant: Hulu, LLC, Santa Monica, CA (US)

(72) Inventors: Deliang Fu, Beijing (CN); Haisheng Wu, Beijing (CN); Binbin Yu, Beijing (CN); Zhibing Wang, Beijing (CN); Xin Jin, Beijing (CN); Baptiste Coudurier, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 405 days.

(21) Appl. No.: 14/245,235

(22) Filed: Apr. 4, 2014

(65) Prior Publication Data
US 2015/0134847 A1    May 14, 2015

Related U.S. Application Data

(60) Provisional application No. 61/902,662, filed on Nov. 11, 2013.

(51) Int. Cl.
*G06F 15/16*      (2006.01)
*H04L 12/801*     (2013.01)
*H04L 12/835*     (2013.01)

(52) U.S. Cl.
CPC .............. *H04L 47/29* (2013.01); *H04L 47/30* (2013.01)

(58) Field of Classification Search
CPC ................................. H04L 47/29; H04L 47/30
USPC ........................................................ 709/234
See application file for complete search history.

(56) References Cited

U.S. PATENT DOCUMENTS

| 8,588,296 | B2* | 11/2013 | Yang | H04N 19/172 |
| | | | | 375/240.03 |
| 9,124,520 | B2* | 9/2015 | VerSteeg | H04L 47/225 |
| 9,288,251 | B2* | 3/2016 | Melnyk | H04L 65/80 |
| 2008/0151998 | A1* | 6/2008 | He | H04N 19/147 |
| | | | | 375/240.03 |
| 2010/0121974 | A1* | 5/2010 | Einarsson | H04L 47/10 |
| | | | | 709/231 |
| 2010/0183033 | A1* | 7/2010 | Hannuksela | H04L 47/10 |
| | | | | 370/476 |
| 2013/0073297 | A1* | 3/2013 | Yu | G10L 19/00 |
| | | | | 704/500 |

(Continued)

*Primary Examiner* — Joseph Greene
(74) *Attorney, Agent, or Firm* — Fountainhead Law Group P.C.

(57) ABSTRACT

In one embodiment, a method determines thresholds for a multiple bitrate algorithm that adjusts which bitrates for a media program are requested. A first threshold is associated with a first buffer length and a first direction of adjustment and a second threshold is associated with a second buffer length greater than the first buffer length and a second direction of adjustment. The method then determines which threshold applies to a buffer length of a buffer buffering the media program. An adjustment to the multiple bitrate algorithm in the first direction or the second direction based on the threshold that applies where the adjustment in the first direction increases an aggressiveness used by the multiple bitrate algorithm to increase the bitrate requested and the adjustment in the second direction decreases the aggressiveness used by the multiple bitrate algorithm to increase the bitrate requested.

21 Claims, 13 Drawing Sheets

(56) References Cited

U.S. PATENT DOCUMENTS

| | | | |
|---|---|---|---|
| 2013/0227106 A1* | 8/2013 | Grinshpun | H04W 4/18 709/223 |
| 2014/0215085 A1* | 7/2014 | Li | H04L 65/4084 709/231 |
| 2014/0281009 A1* | 9/2014 | Moorthy | G06F 17/30017 709/231 |
| 2015/0023404 A1* | 1/2015 | Li | H04N 19/00193 375/240.02 |
| 2015/0128170 A1* | 5/2015 | Fu | H04N 21/23439 725/32 |

* cited by examiner

DYNAMIC ADJUSTMENT TO MULTIPLE BITRATE ALGORITHM BASED ON BUFFER LENGTH

CROSS REFERENCES TO RELATED APPLICATIONS

This application claims the benefit of U.S. Provisional Patent Application No. 61/902,662, filed Nov. 11, 2013 and entitled "DYNAMIC ADJUSTMENT TO MULTIPLE BITRATE ALGORITHM AGGRESSIVENESS BASED ON BUFFER LENGTH", which is incorporated by reference in its entirety for all purposes.

BACKGROUND

When a media file is published, it is typically encoded at different bitrates to accommodate varying bandwidth conditions. Every bitrate version may be sliced into segments. For every bitrate, a server may publish a master playlist (e.g., a list of available bitrate playlists) and a set of bitrate playlists (e.g., a consecutive list of segments for a given bitrate).

During playback, a client may select each consecutive segment based on available bandwidth. This may be done with the goal of maximizing visual quality (i.e., picking the segment with the highest bitrate), while providing an interruption-free experience (i.e., not picking segments that would take too long to download). The client may select segments from multiple bitrates while playing one media program. This process may be referred to as multiple bitrate streaming, which involves adaptively sending media program segments encoded at multiple bitrates to clients. For example, when the client determines that the available bandwidth or download speed is greater than the bitrate of the media program being downloaded, the client can request a higher bitrate version of the media program. In contrast, when the client determines that the available bandwidth or download speed is lower than the current bitrate of the media program being downloaded, the client can request a lower bitrate version of the media program.

SUMMARY

In one embodiment, a method determines a plurality of thresholds for a multiple bitrate algorithm that adjusts which bitrates for a media program are requested. A first threshold is associated with a first buffer length and a first direction of adjustment and a second threshold is associated with a second buffer length greater than the first buffer length and a second direction of adjustment. The method then determines which threshold applies to a buffer length of a buffer buffering at least a portion of the media program. An adjustment to the multiple bitrate algorithm in the first direction or the second direction based on the threshold that applies where the adjustment in the first direction increases an aggressiveness used by the multiple bitrate algorithm to increase the bitrate requested and the adjustment in the second direction decreases the aggressiveness used by the multiple bitrate algorithm to increase the bitrate requested.

In one embodiment, a non-transitory computer-readable storage medium contains instructions, that when executed, control a computer system to be configured for: determining a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining which threshold applies to a buffer length of a buffer buffering at least a portion of the media program; and causing an adjustment to the multiple bitrate algorithm in the first direction or the second direction based on the threshold that applies, wherein the adjustment in the first direction increases an aggressiveness used by the multiple bitrate algorithm to increase the bitrate requested and the adjustment in the second direction decreases the aggressiveness used by the multiple bitrate algorithm to increase the bitrate requested.

In one embodiment, an apparatus includes: one or more computer processors; and a non-transitory computer-readable storage medium comprising instructions, that when executed, control the one or more computer processors to be configured for: determining a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining which threshold applies to a buffer length of a buffer buffering at least a portion of the media program; and causing an adjustment to the multiple bitrate algorithm in the first direction or the second direction based on the threshold that applies, wherein the adjustment in the first direction increases an aggressiveness used by the multiple bitrate algorithm to increase the bitrate requested and the adjustment in the second direction decreases the aggressiveness used by the multiple bitrate algorithm to increase the bitrate requested.

The following detailed description and accompanying drawings provide a better understanding of the nature and advantages of particular embodiments.

DETAILED DESCRIPTION

Described herein are techniques for a multiple bitrate switching system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
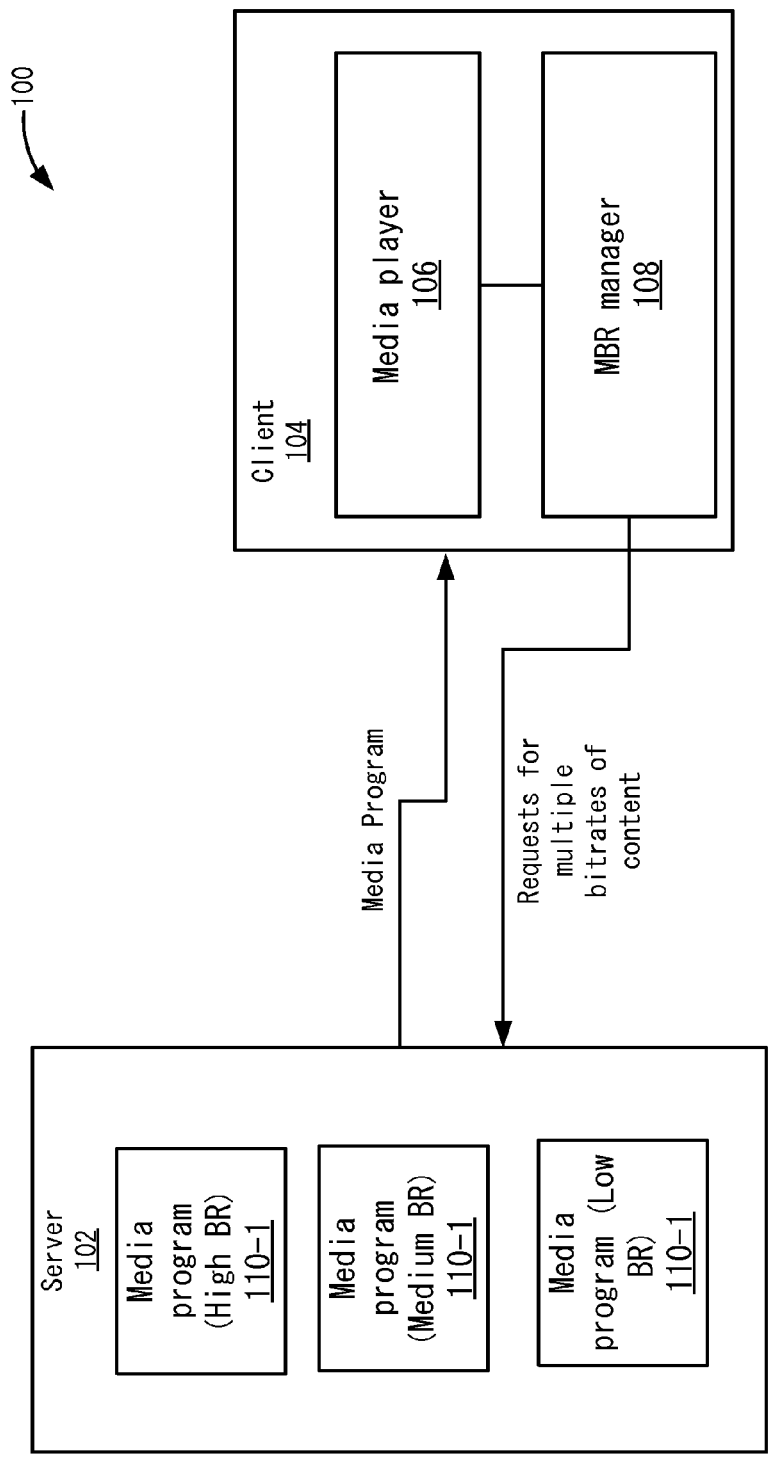
FIG. 1 depicts a system for dynamically changing a safe factor of a multiple bitrate (MBR) switching algorithm according to one embodiment.

FIG. 1 depicts a system 100 for dynamically changing an aggressiveness of a multiple bitrate (MBR) switching algorithm according to one embodiment. System 100 includes a server 102 and a client 104. Although one instance of server 102 and client 104 are shown, multiple instances of server 102 and client 104 may be used.

Server 102 may deliver media programs 110 to client 104. In one example, server 102 includes various media programs, such as video (e.g., a title or show) that have been (or will be) encoded in multiple bitrates. For example, a media program 110 has been divided into segments that an encoder encodes at multiple bitrates, from high to low. As shown, a media program is stored in different versions (i.e., bitrates) as media program 110-1 (high bitrate), media program 110-2 (medium bitrate), . . . , and media program 110-N (low bitrate). The different bitrates provide video at different levels of quality. For example, a higher bitrate video will be of a higher quality than the medium bitrate, and the medium bitrate of a higher quality than the lower bitrate. Although these encodings are described, various embodiments may include different encodings at any number of bitrates.

Client 104 may include various user devices, such as cellular phones, set top boxes, streaming devices, personal computers, tablet computers, etc. Client 104 may include a media player 106 that can play the media program. For example, media player 106 may play videos and/or audio.

Client 104 receives the media program from server 102. For example, client 104 (e.g., media player 106) may request segments of the media program from server 102. While receiving the segments of media program, client 104 can evaluate the bandwidth in which client 104 receives the segments. One evaluation client 104 may perform is measure the amount of the media program (e.g., video) received over a period of time to estimate the available bandwidth.

Depending on the available bandwidth, client 104 may make decisions on which bitrate (or version) of the media program to request. For example, an MBR manager 108 determines which version of the media program to request for a segment of the media program.

MBR manager 108 may use an MBR algorithm to determine when to switch to a different bitrate version of the media program. The MBR algorithm analyzes the available bandwidth and possibly other factors (e.g., computer processing unit load) to determine when to switch to a different bitrate. For example, if the MBR algorithm determines that the available bitrate is 2 Mbps and client 104 is requesting segments of the media program at a bitrate of 1 Mbps, the MBR algorithm may determine that client 104 should request segments of the media program encoded at 2 Mbps.

The MBR algorithm may use a factor that the MBR algorithm uses to determine when, what version of the media program to request, or how much to adjust the bitrate. The factor may be a variable that MBR manager 108 can change. For example, the MBR algorithm may adjust a safe factor, which may determine how aggressive the MBR algorithm is when determining when to switch to another bitrate. In one embodiment, when the safe factor is lower, the MBR algorithm is more aggressive in switching to a higher bitrate. For example, if client 104 determines the available bandwidth is 2 Mbps, and the MBR algorithm is set to be more aggressive, the MBR algorithm may switch to a bitrate of 2 Mbps. Also, the MBR algorithm may be less aggressive in switching to a lower bitrate in this case if the reverse conditions are applied (e.g., the available bandwidth is 0.5 Mbps). However, if the safe factor is set higher, the MBR algorithm may not switch to a higher bitrate until the available bandwidth is higher than 2.5 Mbps. Also, the MBR algorithm may be more aggressive in switching to a lower bitrate.

In one embodiment, an application programming interface (API) of media player 106 may measure the available bandwidth. At some points, the available bandwidth the API measures may not be accurate. For example, when media player 106 is doing an "ON-OFF" downloading, an algorithm may rely on the bandwidth estimated during the "ON" session. However, the fair share of the downloading many be lower than this value if other streams are downloading something during the "OFF" time period. For example, two media players share a bandwidth of 2 Mbps. Each of the media players should only have 1 Mbps bandwidth share. However, when the media players are both downloading the 1 Mbps video, if their "ON-OFF" patterns are well interlaced, both of them will see a not accurate 2 Mbps available bitrate, which makes the bandwidth estimation during this kind of downloading is not accurate.

Particular embodiments recognize that the API may be inaccurately measuring the available bandwidth and adjust the MBR algorithm accordingly. In one embodiment, particular embodiments use the buffer length to determine when inaccuracies in estimating available bandwidth are occurring. For example, when the buffer is a certain length, particular embodiments determine the available bandwidth reading may not be accurate. MBR manager 108 then adjusts the MBR algorithm accordingly to reflect the possible inaccuracy. For example, MBR manager 108 adjusts the safe factor of the MBR algorithm based on a buffer length. As will be described in more detail below, MBR manager 108 may counter intuitively operate the MBR algorithm by not making the MBR algorithm more aggressive in switching to a higher bitrate.

Figure 2:
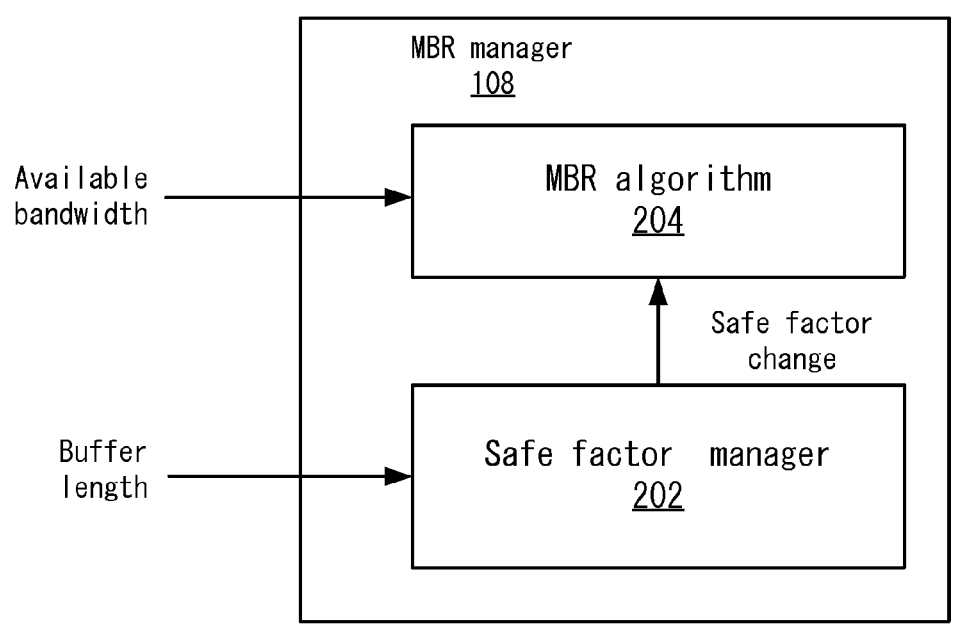
FIG. 2 depicts a more detailed example of an MBR manager according to one embodiment.

FIG. 2 depicts a more detailed example of MBR manager 108 according to one embodiment. A safe factor manager 202 adjusts the safe factor for an MBR algorithm 204. In one embodiment, safe factor manager 202 may use a buffer length to adjust the safe factor. For example, client 104 may use a characteristic associated with playing the media program in media player 106 to adjust the safe factor. In one example, the characteristic used is a buffer length of how much of the media program is buffered. For example, as segments of the media program are received, client 104 stores the segments in the buffer. Media player 106 then reads the segments of the media program from the buffer to play the media program in media player 106. If the media program is received faster than the playback rate of the media program in media player 106, then the buffer length increases. However, if media player 106 is playing the media program at a faster rate than client 104 receives the media program, then the buffer length decreases. Although buffer length will be used for discussion purposes, particular embodiments may also use other media program characteristics, such as a re-buffer history or CPU load, to adjust the safe factor. For example, if media player 106 has to stop playing the media program and re-buffer the media program over a threshold within a time period, safe factor manager 202 may increase the safe factor to decrease the number of re-buffer occurrences.

As mentioned above, safe factor manager 202 adjusts the safe factor based on the buffer length. Safe factor manager 202 may use different thresholds or ranges to determine when to adjust the safe factor. For example, when the buffer length is less than 5 seconds, safe factor manager 202 may increase the safe factor. In this case, the buffer length is low and it may be desirable that MBR algorithm 204 is less aggressive in switching to a higher bitrate. Also, the lower safe factor may cause MBR algorithm 204 to switch to a lower bitrate more aggressively. A second threshold may include the range of a buffer length of greater than 5 seconds and less than 20 seconds. For this buffer length, safe factor manager 202 may decrease the safe factor to make the MBR algorithm more aggressive. For example, the buffer length may include sufficient video for media player 106 to play back and media player 106 can tolerate a higher bitrate without affecting the quality of the playback of the video.

A third threshold may be when the buffer length is greater than or equal to 20 seconds and less than 40 seconds. In this case, safe factor manager 202 may keep the safe factor the same or increase the safe factor. Even though the buffer length is larger than the second threshold, which may intuitively indicate that the safe factor should be decreased to make the MBR algorithm more aggressive, safe factor manager 202 nevertheless increases the safe factor. Also, in some cases, safe factor manager 202 may choose to keep the safe factor the same value, but in all cases, safe factor manager 202 does not decrease the safe factor. As will be described in more detail below, one reason safe factor manager 202 may not decrease the safe factor is that the available bandwidth determined by client 104 may not be accurate. Reasons for the inaccuracy will be described in more detail, but may depend on the API configured that does not measure the available bandwidth accurately due to various factors that cause inaccurate readings, such as the streaming of the media program in discontinuous bursts. To take into account the possible inaccuracy, safe factor manager 202 does not decrease the safe factor when it is possible inaccuracies in the readings are occurring, which may cause MBR algorithm 204 to switch to a higher bitrate version of the media program more quickly. In this case, the MBR algorithm may continue to request segments of the media program at the same bitrate. If the bandwidth reading was not accurate, decreasing the safe factor may cause MBR algorithm 204 to switch to a higher bitrate version of the media program, but the actual available bandwidth may be lower than the higher bitrate. This may cause the buffer length to decrease quickly and may cause jitter in the playback of the video.

Particular embodiments, however, do decrease the safe once a buffer length is reached where the inaccuracies might not have an effect on the playback. For example, a fourth threshold may be a buffer length that is greater than or equal to 40 seconds. In this case, safe factor manager 202 may decrease the safe factor. Decreasing the safe factor may cause MBR algorithm 204 to increase the bitrate of the media program requested more aggressively, which may cause the buffer length to decrease. In this case, the buffer length may be sufficiently large that it may be desirable that client 104 requests the media program at a higher bitrate than the available bandwidth, which lowers the buffer length. This may prevent buffer overflows, which would also affect playback of the media program. Also, even if the available bandwidth reading is inaccurate, decreasing the safe factor may be acceptable and not cause jitter in the playback due to the long buffer length.

The following will describe MBR algorithm 204 in more detail, the effect of the safe factor on MBR algorithm 204, and the use of the buffer length to adjust the safe factor.

Figure 3A:
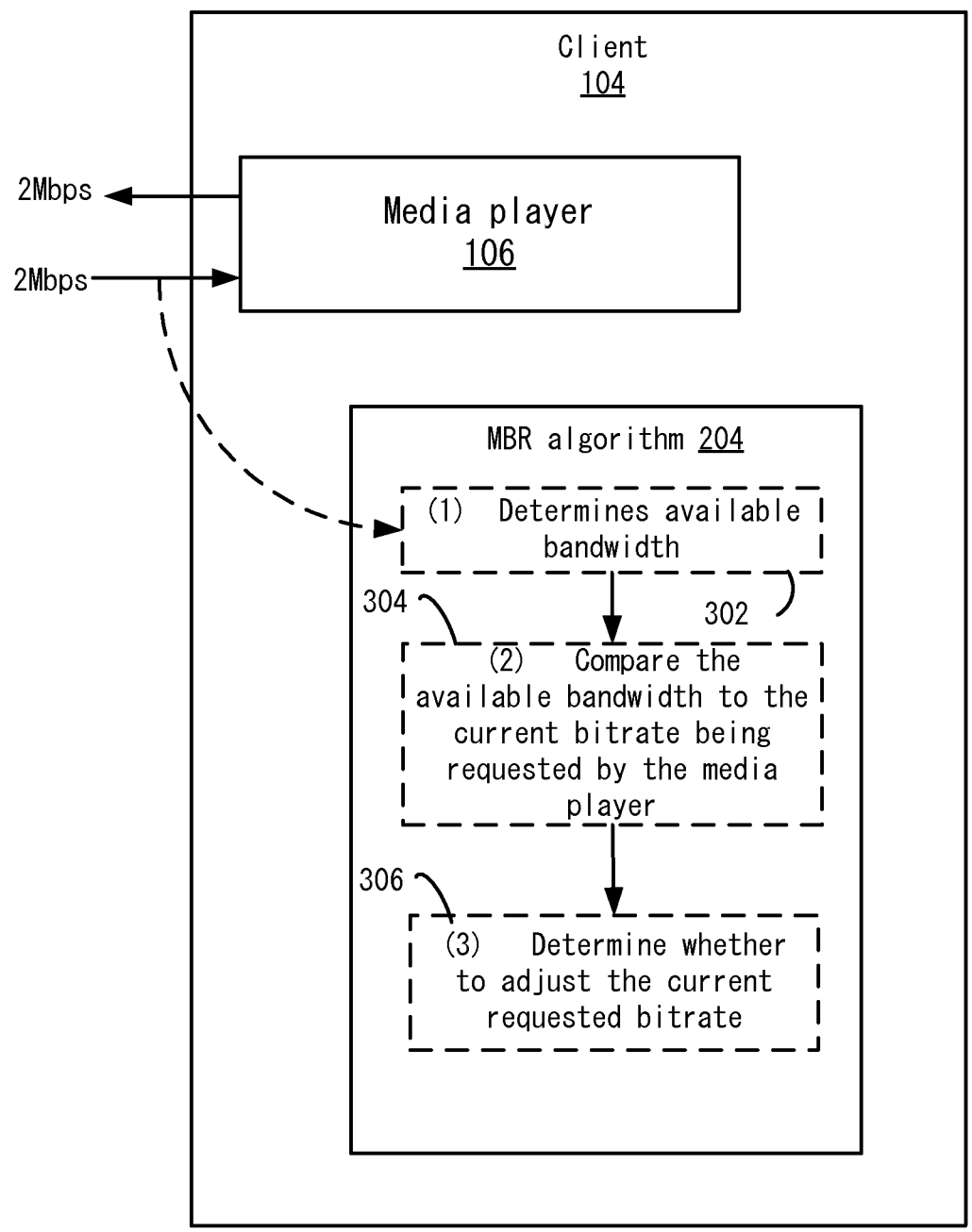
FIG. 3A depicts an example where the MBR algorithm decides whether to increase or decrease the currently requested bitrate according to one embodiment.
Figure 3B:
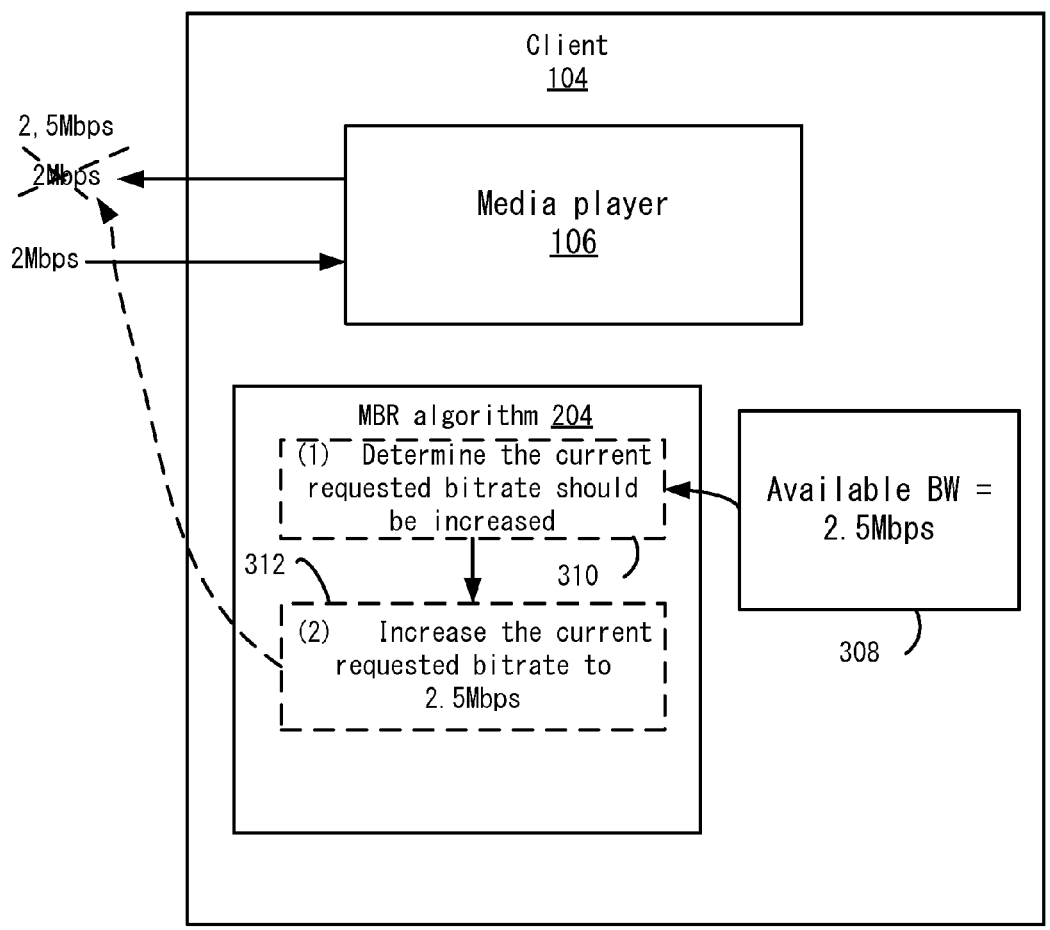
FIG. 3B depicts an example where the MBR algorithm increases the currently requested bitrate according to one embodiment.
Figure 3C:
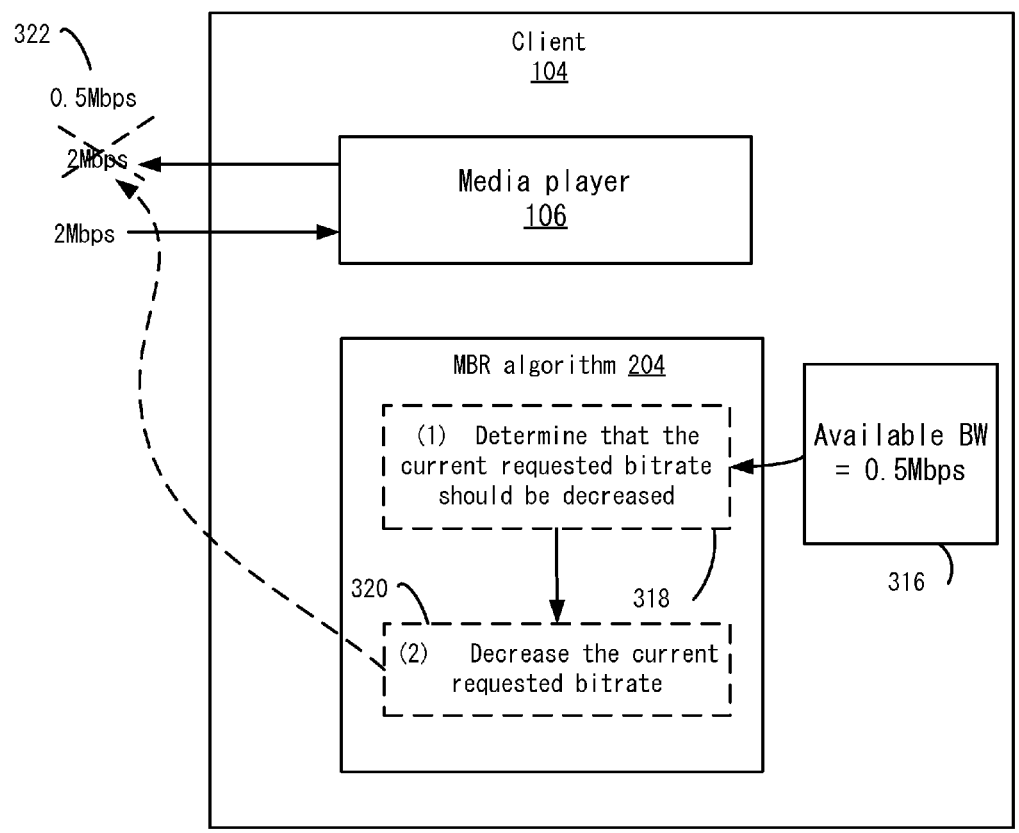
FIG. 3C shows an example where the MBR algorithm decreases the current requested bitrate according to one embodiment.

FIGS. 3A-3C show the operation of MBR algorithm 204 according to one embodiment. FIG. 3A depicts an example where MBR algorithm 204 decides whether to increase or decrease the currently requested bitrate according to one embodiment. Currently, media player 106 is requesting a version of the media program at 2 Mbps. Media player 106 also receives segments of the media program that have been encoded at 2 Mbps.

At step 1 (reference #302), MBR algorithm 204 determines the available bandwidth. For example, a media player application programming interface (API) may calculate the available bandwidth based on the amount of the media program received over a period of time. At step 2 (reference #304), MBR algorithm 204 compares the available bandwidth to the current bitrate being requested by media player 106. For example, if the available bandwidth is XMbps, where X is a number, MBR algorithm 204 compares XMbps to 2 Mbps. In step 3 (reference #306), MBR algorithm 204 determines whether to adjust the current requested bitrate. For example, MBR algorithm 204 may determine whether to keep the current requested bitrate the same, increase the current requested bitrate, or decrease the current requested bitrate. In one example, MBR algorithm selects between different versions of the media program. Thus, when increasing the bitrate is discussed, this may mean requesting a version with a higher bitrate. FIGS. 3B and 3C depict two different scenarios.

FIG. 3B depicts an example where MBR algorithm 204 increases the currently requested bitrate according to one embodiment. As shown at 308, the calculated available bandwidth is 2.5 Mbps and the current requested bitrate is 2 Mbps. Thus, the available bandwidth is greater than the current requested bitrate. In step 1 (reference #310), MBR algorithm 204 determines the current requested bitrate should be increased. For example, MBR algorithm 204 may be configured to increase the bitrate when the available bandwidth is greater than the current requested bitrate. As will be discussed in more detail below, various factors, such as the safe factor, are used to determine when MBR algorithm 204 determines the increase. At step 2 (reference #312), MBR algorithm 204 increases the current requested bitrate. As shown at 314, media player 106 is now requesting the 2.5 Mbps version of the media program. This is an increase over the previous requested bitrate.

MBR algorithm 204 may determine the amount of the increase based on the comparison of the current requested bitrate and the available bandwidth. For example, in some cases, MBR algorithm 204 may increase the current requested bitrate to be equal to the current available bandwidth. In other cases, MBR algorithm 204 may increase the current requested bitrate to be above the available bandwidth or to be below the available bandwidth. For example, MBR algorithm 204 may increase the current requested bitrate to 3.0 Mbps if being aggressive, or may increase the current requested bitrate to 2.0 Mbps if not being as aggressive. This may depend on the setting of the safe factor, which will be described in more detail below.

FIG. 3C shows an example where MBR algorithm 204 decreases the current requested bitrate according to one embodiment. At 316, the available bandwidth has been calculated at 0.5 Mbps. Thus, the available bandwidth is below the current requested bitrate of 2 Mbps. At step 1 (reference #318), MBR algorithm 204 determines that the current requested bitrate should be decreased because the available bandwidth is below the current requested bitrate. If the current requested bitrate continues to be requested, playback of the media program may become adversely affected, such as the playback may become choppy as the amount of video in the buffer becomes depleted. Thus, in step 2 (reference #320), MBR algorithm 204 decreases the current requested bitrate. As shown at 322, the current requested bitrate has been decreased to 0.5 Mbps. In this case, MBR algorithm 204 has decreased the current requested bitrate to be equal to the available bandwidth. In this case, MBR algorithm may request a version of the media program encoded at 0.5 Mbps. However, as will be discussed in more detail below, based on the aggressiveness of MBR algorithm 204, MBR algorithm 204 may adjust the current requested bitrate to be above or below the current available bandwidth. For example, a lower safe factor may decrease the requested bitrate to 1 Mbps instead of 0.5 Mbps. This effect of the safe factor will now be described in more detail in FIGS. 4A-4D.

Figure 4A:
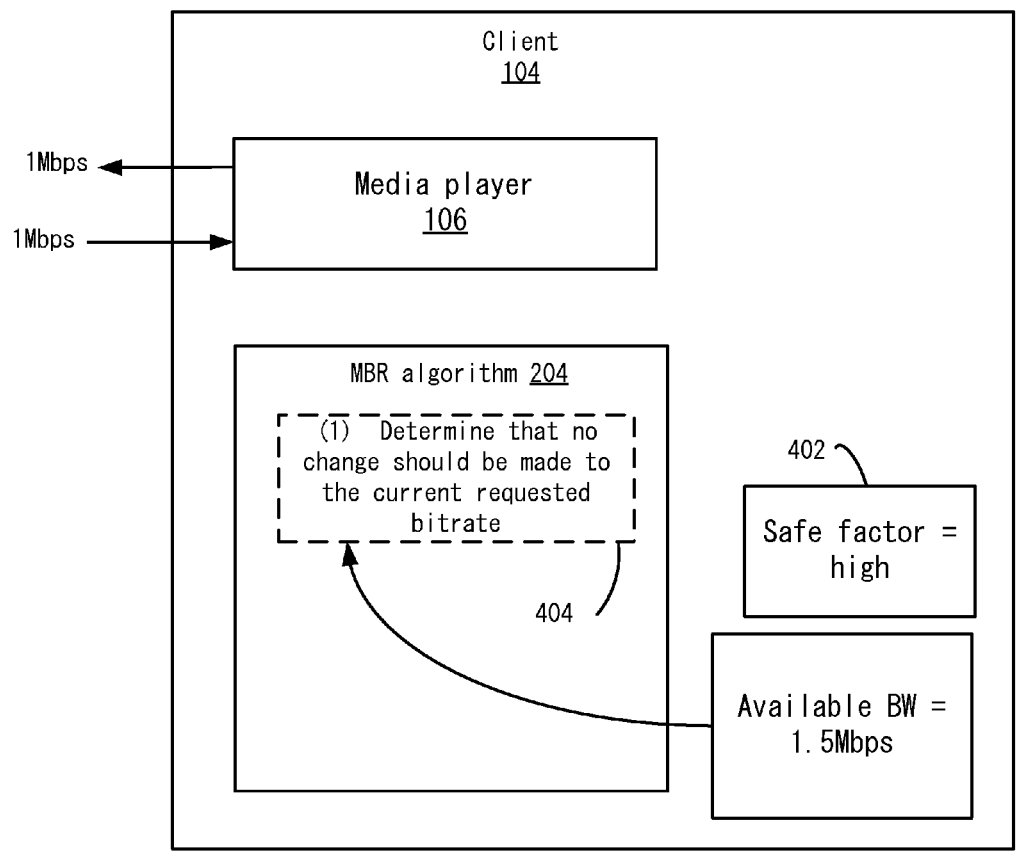
FIG. 4A depicts an example showing when the safe factor is high according to one embodiment.

FIG. 4A depicts an example showing when the safe factor is high according to one embodiment. When the term "high" is being used, high may be quantified using various scales. For example, if the range of the safe factor is from 1-10, high may be from the range 7-10. Also, other ranges may be provided, such as high, medium, or any other scales.

In FIG. 4A, media player 106 is requesting a version of the media program at the 1 Mbps bitrate. However, the available bandwidth is 1.5 Mbps. At 402, the safe factor is shown as being set to "high". For example, the safe factor may be set to the value of 7 out of 10. In step 1 (reference #404), MBR algorithm 204 determines that no change should be made to the current requested bitrate. One reason MBR algorithm 204 does not make a change to the current requested bitrate is MBR algorithm 204 does not want to be too aggressive even though the available bandwidth of 1.5 Mbps is greater than the requested bitrate of 1 Mbps. However, MBR algorithm 204 may increase the bitrate if the available bandwidth goes up even more. The following will show when MBR algorithm 204 does increase the current requested bitrate even though the safe factor is set to "high".

Figure 4B:
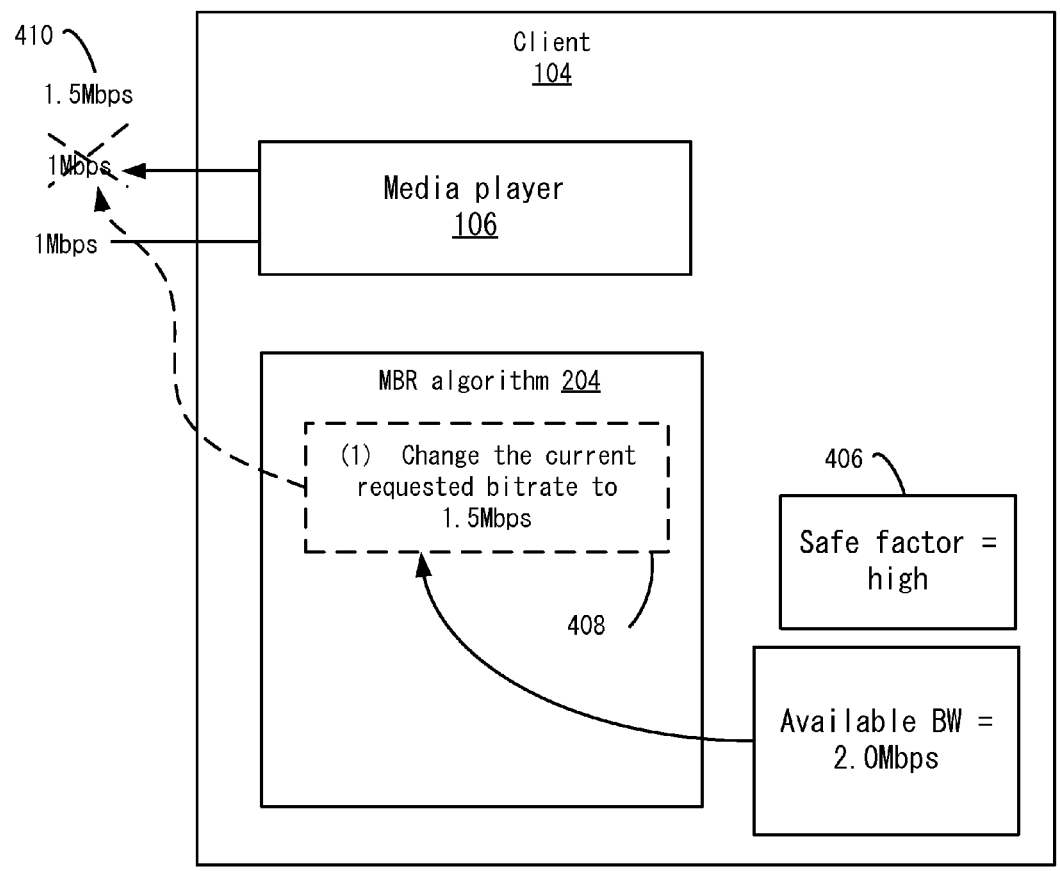
FIG. 4B shows an example of increasing the current requested bitrate according to one embodiment.

FIG. 4B shows an example of increasing the current requested bitrate according to one embodiment. As shown, media player 106 is currently requesting the bitrate of the media program at 1 Mbps. However, the available bandwidth is calculated at 2.0 Mbps. Thus, the available bandwidth in FIG. 4B is even greater than the available bandwidth in FIG. 4A.

At 406, the safe factor is still set to the value of "high". However, MBR algorithm 204 may make a different decision regarding the requested bitrate due to the available bandwidth being higher in FIG. 4B than the available bandwidth in FIG. 4A. For example, at step 1 (reference #406), MBR algorithm 204 changes the current requested bitrate to 1.5 Mbps or requests the 1.5 Mbps version of the media program.

Figure 4C:
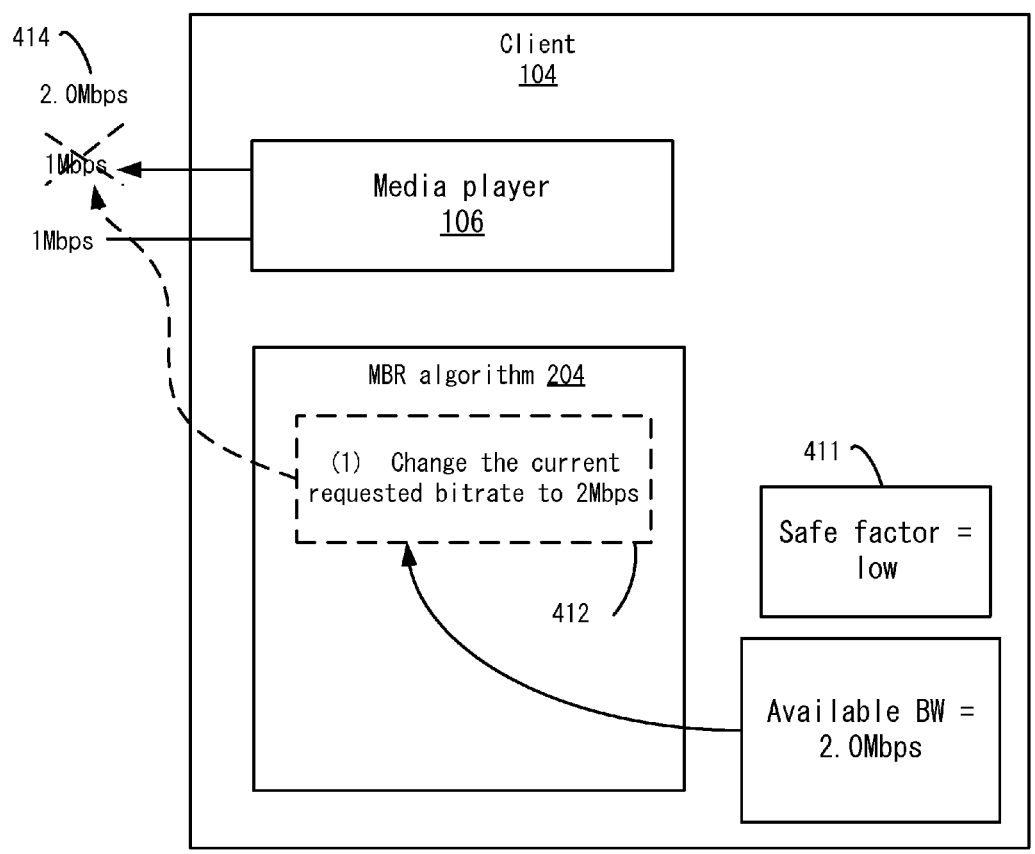
FIG. 4C shows an example where the MBR algorithm increases the current requested bitrate using a lower safe factor according to one embodiment.

Accordingly, MBR algorithm 204 has changed the current requested bitrate to 1.5 Mbps as shown at 410. The current requested bitrate is still below the available bandwidth, but has been increased. If MBR algorithm 204 wanted to be more aggressive, then MBR algorithm 204 may have increased the current requested bitrate even more. FIG. 4C shows an example illustrating this concept.

FIG. 4C shows an example where MBR algorithm 204 increases the current requested bitrate using a lower safe factor according to one embodiment. As shown, the current requested bitrate is 1 Mbps and the available bandwidth is 2.0 Mbps. Accordingly, the current requested bitrate and the available bandwidth are the same as the values shown in FIG. 4B. At 411, the safe factor has been set to a "low" level. For example, the high level may be a 3 out of 10. In step 1 (reference #412), MBR algorithm 204 determines that the current requested bitrate should be increased to 2.0 Mbps. As shown at 414, MBR algorithm 204 has increased the requested bitrate to 2.0 Mbps. Thus, media player 106 is now requesting segments of the media program at the same bitrate as the available bandwidth. In this case, MBR algorithm 204 increases the current requested bitrate in contrast to making a change to 1.5 Mbps in FIG. 4B. Due to the safe factor being lower, MBR algorithm 204 increased the requested bitrate more than the example shown in FIG. 4B where the safe factor was set at a higher level.

The above showed the effect of the safe factor on MBR algorithm 204. The following will now describe a process to adjust the safe factor based on buffer length. The relationship of the buffer length to the accuracy of the available bandwidth calculation may be leveraged to determine when to adjust the safe factor. As will be described below, in a certain buffer length range, safe factor manager 202 may make a counter intuitive adjustment to the safe factor.

Figure 5:
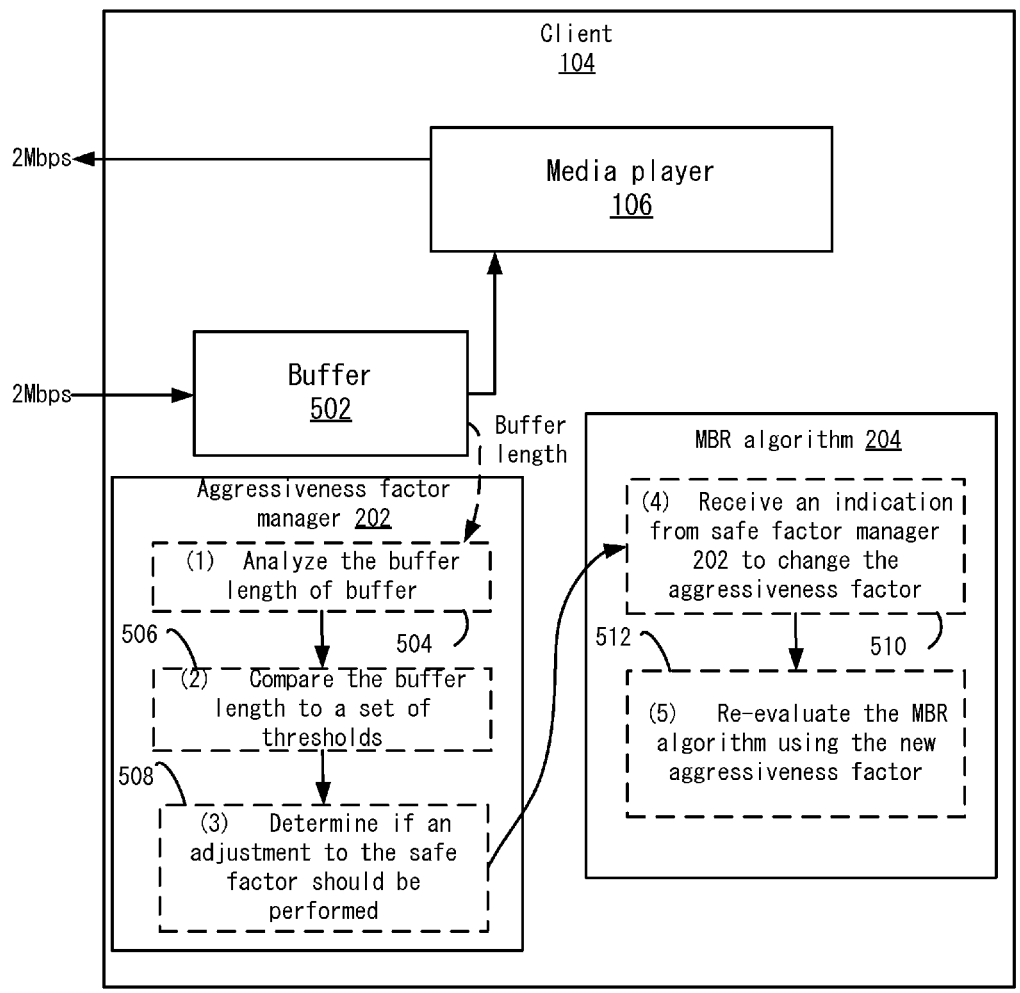
FIG. 5 depicts an example of adjusting the safe factor according to one embodiment.

FIG. 5 depicts an example of adjusting the safe factor according to one embodiment. Client 104 includes a buffer 502 that receives segments of the media program from server 102. Client 104 stores the segments in buffer 502 prior to playing them on media player 106. In this case, media player 106 reads segments of the media program according to a playback bitrate. For example, media player 106 may read the segment of the media program out of buffer 502 at the same rate in which media player 106 is requesting segments of the media program. If segments of the media program are being received at the same rate as media player 106 is reading segments out of buffer 502, then the length of buffer 502 remains the same. However, variations in the available bandwidth may result. This may cause the length of buffer 502 to vary. For example, if the available bandwidth is below the playback bitrate, then the length of buffer 502 may decrease. This is because media player 106 is reading segments out of buffer 502 faster than segments are being stored in buffer 502. Conversely, if the available bandwidth is greater than the playback bitrate, then the length of buffer 502 may increase. This is because media player 106 is reading segments out of buffer 502 slower than segments are being stored in buffer 502.

To account for the variations, safe factor manager 202 analyzes the length of buffer 502 to determine how to adjust the safe factor. In step 1 (reference #504), safe factor manager 202 analyzes the buffer length of buffer 502. In one embodiment, the buffer length may be measured in a time unit, such as seconds. Other units may also be used, such as safe factor manager 202 may measure the amount of data stored in buffer 502. In step 2 (reference #506), safe factor manager 202 compares the buffer length to a set of thresholds. For example, the set of thresholds may be ranges of time, such as less than or equal to 5 seconds (<=5), greater than 5 seconds and less than 20 seconds (>5 and <20), greater than or equal to 20 seconds and less than 40 seconds (>=20 and <40), and greater than or equal to 40 seconds (>=40). Other thresholds may also be appreciated and the granularity may be higher than integer precision.

In step 3 (reference #508), safe factor manager 202 determines if an adjustment to the safe factor should be performed. For example, as described above, safe factor manager 202 may adjust the safe factor based on whether the available bandwidth falls within one of the four thresholds.

If the safe factor should be changed, in step 4 (reference #510), MBR algorithm 204 receives an indication from safe factor manager 202 to change the safe factor. For example, safe factor manager 202 may indicate the value to change the safe factor to, such as change the safe factor to a value of "8". Also, safe factor manager 202 may just indicate that an increase in the safe factor should be performed. MBR algorithm 204 may then increase the safe factor by a certain increment, such as from "7" to "8".

In step 5 (reference #512), MBR algorithm 204 then re-evaluates the MBR algorithm using the new safe factor. MBR algorithm 204 may adjust the current requested bitrate as described in FIGS. 4A-4C based on the value of the new safe factor.

Figure 6:
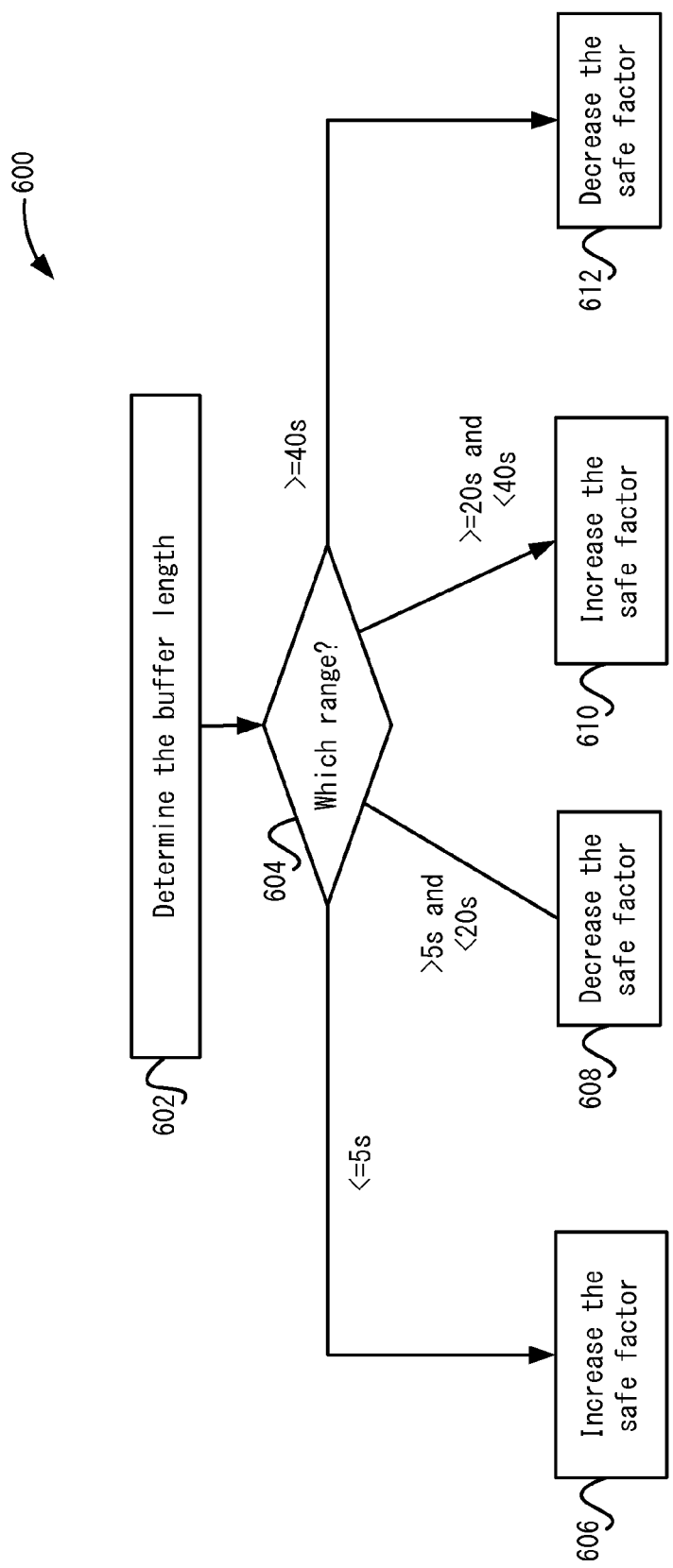
FIG. 6 shows another example of adjusting the safe factor according to one embodiment.

FIG. 6 shows a simplified flowchart 600 of an example of adjusting the safe factor according to one embodiment. As mentioned above, safe factor manager 202 adjusts the safe factor in a counter-intuitive manner for one or more thresholds or ranges. At 602, safe factor manager 202 determines the buffer length. For example, the buffer length may be quantified by a certain time, such as 25 seconds, which may mean there is 25 seconds of video stored in the buffer. Then, at 604, safe factor manager 202 determines which range the buffer length falls within. For example, various thresholds of <=5, >5 and <20 seconds, >=20 and <40 seconds, and >=40 seconds are available.

At 606, if it is determined that the buffer length falls within the less than or equal to 5 seconds range, then safe factor manager 202 increases the safe factor. This causes MBR algorithm 204 to be less aggressive in switching the current requested bandwidth higher. For example, MBR algorithm 204 may only increase the current requested bandwidth from 1 to 2 Mbps when the current available bandwidth is 2.5 Mbps. Safe factor manager 202 may lower the aggressiveness when the range is less than or equal to 5 seconds because the buffer length of buffer 502 may be low. Thus, particular embodiments may want to be conservative when increasing the current requested bitrate because playback may be adversely affected if the buffer length becomes smaller and there is less video in the buffer to play if there is a break in receiving the media program. Also, not being aggressive in increasing the current requested bitrate may allow the buffer length of buffer 502 to increase, which may provide for a larger amount of video in the buffer in case interruptions occur.

At 608, when the buffer length falls within the range of >5 and <20 seconds, safe factor manager 202 decreases the safe factor. In this case, safe factor manager 202 may consider the buffer length to be adequate so that media player 106 can request a higher bitrate. For example, as described in FIG. 4C, when a low safe factor is used, MBR algorithm 204 may increase the current requested bitrate to be equal to the available bandwidth. Because the buffer length is longer than 5 seconds, it is possible that slight variations in the available bandwidth will not deplete buffer 502 and playback will not be adversely affected. Also, by requesting a higher bitrate, the quality of the media program will be increased.

At 610, if the buffer length of buffer 502 falls within the >=20 and <40 seconds range, safe factor manager 202 increases the safe factor. Intuitively, it would be expected that since this buffer length is greater than the buffer length of the >5 and <20 seconds range, safe factor manager 202 would decrease the safe factor even more. However, as described above, particular embodiments may not decrease the safe factor due to possible errors in readings of the available bandwidth. Accordingly, because the buffer length reading may not be accurate, particular embodiments may not want to be aggressive in increasing the current requested bandwidth just in case the available bandwidth may be actually lower than the calculated available bandwidth. For example, if the available bandwidth is lower than the actual reading and the current requested bitrate is increased, the buffer length may be depleted more quickly than anticipated, which may adversely affect the playback. Thus, by either increasing the safe factor or keeping the safe factor the same, particular embodiments may account for the possible error in the available bandwidth reading.

At 612, if the buffer length of buffer 502 falls within the range of >=40 seconds, then, safe factor manager 202 decreases the safe factor. In this case, safe factor manager 202 assumes that the buffer length is long enough that even if the available bandwidth reading is inaccurate, the amount of segments of the media program stored in buffer 502 is sufficient that playback would not be adversely affected or may decrease the buffer length.

Accordingly, particular embodiments adjust the safe factor based on the buffer length. In a counter-intuitive manner, particular embodiments increase the safe factor for a range that is in between two ranges that decrease the safe factor. For example, the range >=20 and <40 seconds is in between the >5 and <20 seconds range and the >=40 seconds range. However, particular embodiments increase the safe factor for the >=20 and <40 seconds range while decreasing the safe factor for the >5 and <20 seconds range and (>=40 seconds range. The counter-intuitive adjustment of the safe factor accounts for possible inaccurate readings of the available bandwidth. Not being as aggressive in increasing the current requested bitrate may improve the playback of a media program due to not erroneously increasing the current requested bitrate when the available bandwidth is actually lower than the calculated available bandwidth.

Figure 7:
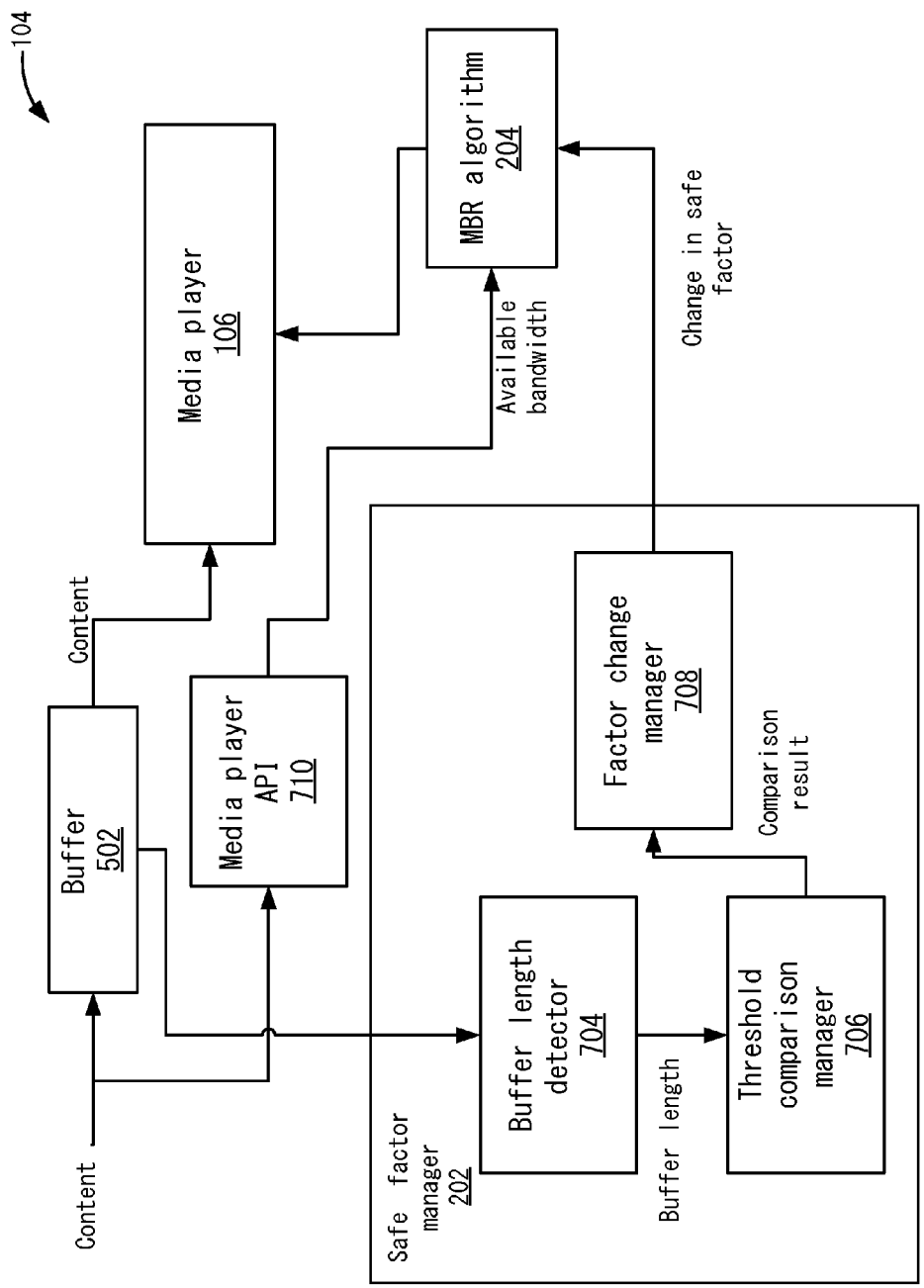
FIG. 7 depicts a more detailed example of the safe factor determination according to one embodiment.

FIG. 7 depicts a more detailed example of the safe factor determination according to one embodiment. A buffer 502 receives video from server 102 and stores the video. As buffer 502 receives more video than media player 106 retrieves from buffer 502, the buffer length increases. Conversely, when buffer 502 receives less video than media player 106 retrieves from buffer 502, the buffer length decreases.

A buffer length detector 704 detects the buffer length. Buffer length detector 704 may then provide the buffer length to a threshold comparison manager 706. Threshold comparison manager 706 compares the buffer length to thresholds as described above.

A factor change manager 708 may determine when the change to the safe factor should be made. For example, factor change manager 708 receives the result of the comparison from threshold comparison manager 706 and determines if a change to the safe factor should be made. Factor change manager 708 may make the change based on various conditions. For example, factor change manager 708 may determine the current factor and the current range. If the previous range is different from the current range, factor change manager 708 may determine that the safe factor should be changed. In one embodiment, factor change manager 708 may determine that the safe factor should be increased or decreased by a certain amount.

MBR algorithm 204 receives the change from factor change manager 708 and can change the safe factor used in the algorithm. MBR algorithm 204 also receives the available bandwidth reading from a media player application programming interface (API) 710. Media player API 710 may analyze the media program received over a period of time and determine the available bandwidth. In some cases, media player API 710 may not analyze the available bandwidth accurately. For example, the accuracy of bandwidth estimation is high when media player 106 is continuously downloading the media program. In this case, media player API 710 accurately determines the available bandwidth. However, the accuracy is low when the downloading is not continuous because media player API 710 does not have much information about the available bandwidth when the downloading is not in progress. That is, media player API 710 cannot count the amount of media program over a period of time if client 104 is not receiving any media program. Also, when the buffer length is long, media player 106 may not continuously download the media program all the time, which again may make the available bandwidth estimation not very accurate. Thus, particular embodiments determine a range in which the safe factor is not decreased, and determine when the buffer length is long enough where the inaccuracy could be tolerated.

SYSTEM OVERVIEW

Figure 8:
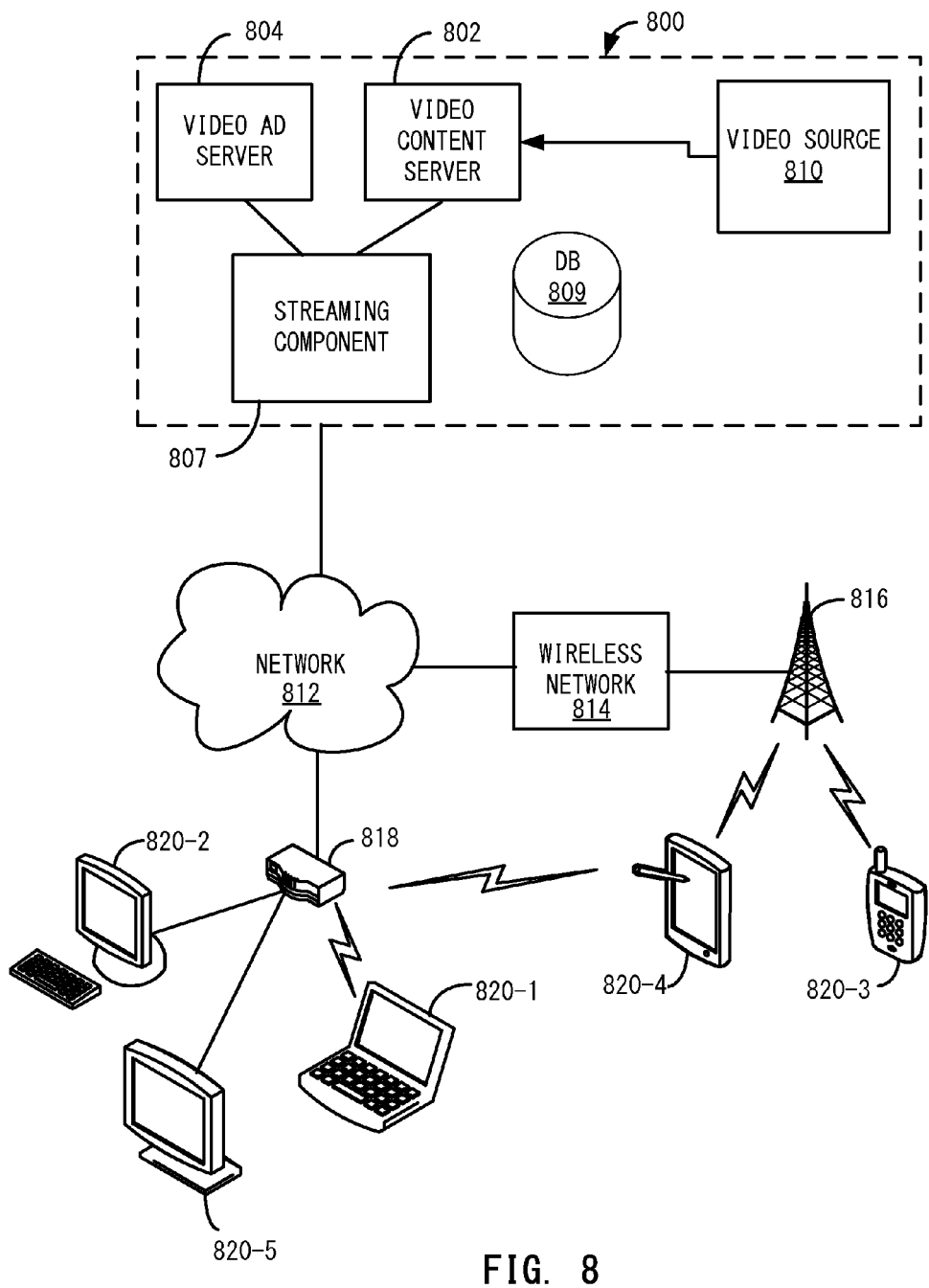
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution of content prepared according to the present disclosure. It should be appreciated that the present technology is not limited to streaming video applications, and may be adapted for other applications.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 816 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
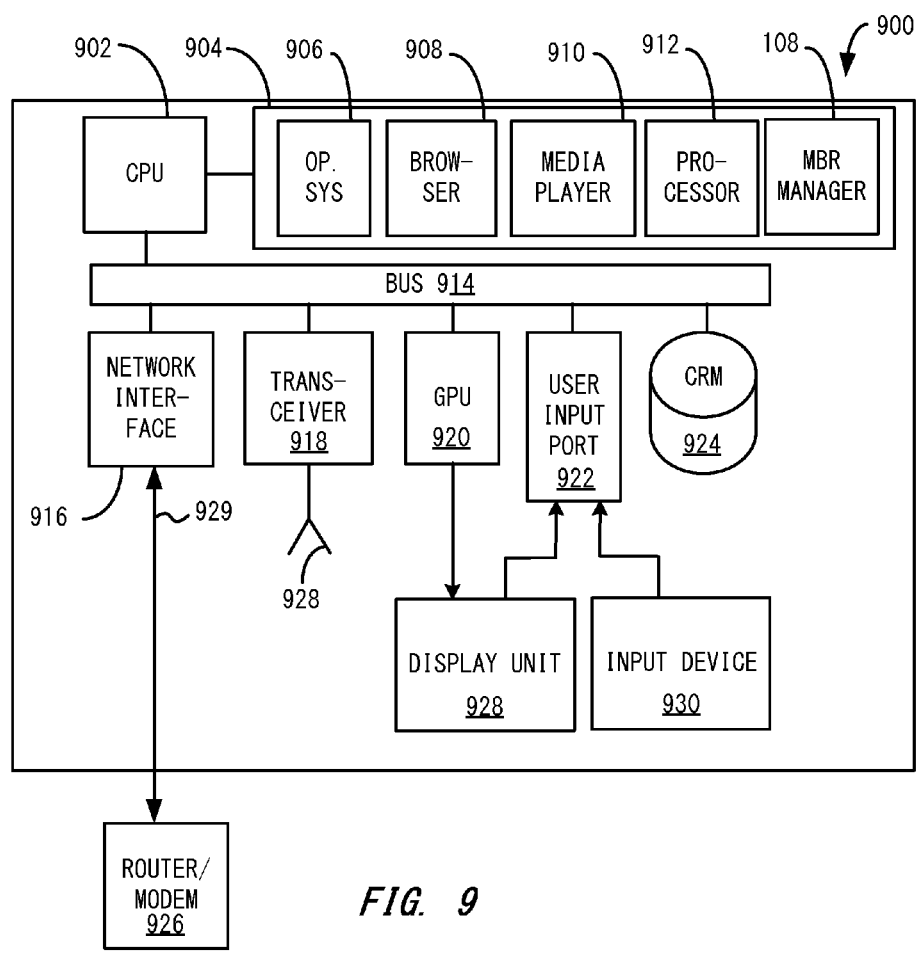
FIG. 9 depicts a diagrammatic view of an apparatus for viewing video media program and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include MBR manager 108. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, 910 and 912 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 928, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising: determining, by a computing device, a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining, by the computing device, which threshold applies to a buffer length of a buffer buffering at least a portion of the media program; when the first threshold applies, causing, by the computing device, an adjustment to the multiple bitrate algorithm in the first direction to increase an aggressiveness used by the multiple bitrate algorithm to increase the bitrate requested; when the second threshold applies due to the buffer length of the buffer being greater than when the first threshold applies, causing, by the computing device, the adjustment to the multiple bitrate algorithm in the second direction to decrease the aggressiveness used by the multiple bitrate algorithm to increase the bitrate requested, wherein to account for possible inaccurate readings of an available bandwidth, a third threshold is used; and when the third threshold applies due to the buffer length of the buffer being greater than the second buffer length, causing, by the computing device, the adjustment to the multiple bitrate algorithm in the first direction to increase the aggressiveness used by the multiple bitrate algorithm to increase the bitrate requested.

2. The method of claim 1, wherein:
a factor is used by the multiple bitrate algorithm to increase or decrease the aggressiveness of the multiple bitrate algorithm to increase the bitrate requested, and
the adjustment adjusts the factor.

3. The method of claim 2, wherein:
a decrease in the factor makes the multiple bitrate algorithm more aggressive in increasing the bitrate requested, and
an increase in the factor makes the multiple bitrate algorithm less aggressive in increasing the bitrate requested.

4. The method of claim 1, wherein:
receiving the buffer length for the buffer, wherein a media program player reads the at least a portion of the media program from the buffer to play the media program; and
comparing the buffer length to the plurality of thresholds.

5. The method of claim 1, further comprising:
when a fourth threshold applies due to the buffer length of the buffer being less than the first buffer length, causing the adjustment to the multiple bitrate algorithm in the second direction to decrease the aggressiveness used by the multiple bitrate algorithm to increase the bitrate requested.

6. The method of claim 1, the method further comprising: adjusting a safe factor in the multiple bitrate algorithm, wherein a higher safe factor means the multiple bitrate algorithm is less aggressive in increasing the requested bitrate; and determining whether to adjust the bitrate requested using the adjusted safe factor.

7. The method of claim 6, wherein determining whether to adjust comprises: determining the available bandwidth; and determining whether to adjust the bitrate based on the available bandwidth and the adjusted safe factor.

8. The method of claim 7, wherein the available bandwidth is determined based on an amount of the media program received over time.

9. The method of claim 1, wherein the multiple bitrate algorithm switches between requesting available versions of the media program encoded at different bitrates when determining whether to increase the bitrate requested.

10. A non-transitory computer-readable storage medium containing instructions, that when executed, control a computer system to be configured for: determining a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining which threshold applies to a buffer length of a buffer buffering at least a portion of the media program; when the first threshold applies, causing an adjustment to the multiple bitrate algorithm in the first direction to increase an aggressiveness used by the multiple bitrate algorithm to increase the bitrate requested; when the second threshold applies due to the buffer length of the buffer being greater than when the first threshold applies, causing the adjustment to the multiple bitrate algorithm in the second direction to decrease the aggressiveness used by the multiple bitrate algorithm to increase the bitrate requested, wherein to account for possible inaccurate readings of an available bandwidth, a third threshold is used; and when the third threshold applies due to the buffer length of the buffer being greater than the second buffer length, causing the adjustment to the multiple bitrate algorithm in the first direction to increase the aggressiveness used by the multiple bitrate algorithm to increase the bitrate requested.

11. The non-transitory computer-readable storage medium of claim 10, wherein:
a factor is used by the multiple bitrate algorithm to increase or decrease the aggressiveness of the multiple bitrate algorithm to increase the bitrate requested, and the adjustment adjusts the factor.

12. The non-transitory computer-readable storage medium of claim 11, wherein:
a decrease in the factor makes the multiple bitrate algorithm more aggressive in increasing the bitrate requested, and
an increase in the factor makes the multiple bitrate algorithm less aggressive in increasing the bitrate requested.

13. The non-transitory computer-readable storage medium of claim 10, wherein:
receiving the buffer length for the buffer, wherein a media program player reads the at least a portion of the media program from the buffer to play the media program; and comparing the buffer length to the plurality of thresholds.

14. The non-transitory computer-readable storage medium of claim 10, further comprising:
when a fourth threshold applies due to the buffer length of the buffer being less than the first buffer length, causing the adjustment to the multiple bitrate algorithm in the second direction to decrease the aggressiveness used by the multiple bitrate algorithm to increase the bitrate requested.

15. The non-transitory computer-readable storage medium of claim 10, the method further comprising: adjusting a safe factor in the multiple bitrate algorithm, wherein a higher safe factor means the multiple bitrate algorithm is less aggressive in increasing the requested bitrate; and determining whether to adjust the bitrate requested using the adjusted safe factor.

16. The non-transitory computer-readable storage medium of claim 15, wherein determining whether to adjust comprises: determining the available bandwidth; and determining whether to adjust the bitrate based on the available bandwidth and the adjusted safe factor.

17. The non-transitory computer-readable storage medium of claim 16, wherein the available bandwidth is determined based on an amount of the media program received over time.

18. The non-transitory computer-readable storage medium of claim 10, wherein the multiple bitrate algorithm switches between requesting available versions of the media program encoded at different bitrates when determining whether to increase the bitrate requested.

19. An apparatus comprising: one or more computer processors; and a non-transitory computer-readable storage medium comprising instructions, that when executed, control the one or more computer processors to be configured for: determining a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining which threshold applies to a buffer length of a buffer buffering at least a portion of the media program; when the first threshold applies, causing an adjustment to the multiple bitrate algorithm in the first direction to increase an aggressiveness used by the multiple bitrate algorithm to increase the bitrate requested; when the second threshold applies due to the buffer length of the buffer being greater than when the first threshold applies, causing the adjustment to the multiple bitrate algorithm in the second direction to decrease the aggressiveness used by the multiple bitrate algorithm to increase the bitrate requested, wherein to account for possible inaccurate readings of an available bandwidth, a third threshold is used; and when the third threshold applies due to the buffer length of the buffer being greater than the second buffer length, causing the adjustment to the multiple bitrate algorithm in the first direction to increase the aggressiveness used by the multiple bitrate algorithm to increase the bitrate requested.

20. A method comprising: determining, by a computing device, a plurality of thresholds for a multiple bitrate algorithm that adjusts which bitrates for a media program are requested, wherein a first threshold is associated with a first buffer length and a first direction of adjustment and a second threshold is associated with a second buffer length greater than the first buffer length and a second direction of adjustment; determining, by the computing device, which threshold applies to a buffer length of a buffer buffering at least a portion of the media program; when the first threshold applies, causing, by the computing device, an adjustment to the multiple bitrate algorithm in the first direction to increase an aggressiveness used by the multiple bitrate algorithm to increase the bitrate requested; when the second threshold applies due to the buffer length of the buffer being greater than when the first threshold applies, not adjusting, by the computing device, the multiple bitrate algorithm to increase or decrease the aggressiveness, wherein to account for possible inaccurate readings of an available bandwidth, a third threshold is used; and when the third threshold applies due to the buffer length of the buffer being greater than the second buffer length, causing the adjustment to the multiple bitrate algorithm in the first direction to increase the aggressiveness used by the multiple bitrate algorithm to increase the bitrate requested.

21. The method of claim 20, further comprising:
when a fourth threshold applies due to the buffer length of the buffer being less than the first buffer length, causing the adjustment to the multiple bitrate algorithm in the second direction to decrease the aggressiveness used by the multiple bitrate algorithm to increase the bitrate requested.

* * * * *